US010505897B2

(12) United States Patent
Dasar et al.

(10) Patent No.: US 10,505,897 B2
(45) Date of Patent: Dec. 10, 2019

(54) AUTOMATED FIREWALL-COMPLIANT CUSTOMER SUPPORT RESOLUTION PROVISIONING SYSTEM

(71) Applicant: Dell Products L.P., Round Rock, TX (US)

(72) Inventors: Sundar Dasar, Round Rock, TX (US); Divya Vijayvargiya, Cedar Park, TX (US); Sanjay Rao, Austin, TX (US); Yogesh Prabhakar Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 15/660,119

(22) Filed: Jul. 26, 2017

(65) Prior Publication Data

US 2019/0036880 A1    Jan. 31, 2019

(51) Int. Cl.
*H04L 29/06*     (2006.01)
*H04L 29/08*     (2006.01)
*G06F 16/9535*   (2019.01)
*G06F 11/00*     (2006.01)
*H04L 12/24*     (2006.01)

(52) U.S. Cl.
CPC .......... *H04L 63/0245* (2013.01); *G06F 11/00* (2013.01); *G06F 16/9535* (2019.01); *H04L 41/5061* (2013.01); *H04L 63/029* (2013.01); *H04L 63/0227* (2013.01); *H04L 67/02* (2013.01)

(58) Field of Classification Search
CPC .. H04L 63/0245; H04L 63/0254; H04L 67/02
See application file for complete search history.

(56) References Cited

U.S. PATENT DOCUMENTS

| 8,448,015 | B2 * | 5/2013 | Gerhart | .................. G06Q 10/06 714/4.4 |
| 8,832,259 | B1 * | 9/2014 | Kearns | ................ H04L 41/0604 709/224 |
| 2003/0033366 | A1 * | 2/2003 | Garnett | ................... G06F 1/183 709/203 |
| 2004/0148385 | A1 * | 7/2004 | Srinivasan | .......... H04L 41/0253 709/224 |

(Continued)

*Primary Examiner* — Ellen Tran
(74) *Attorney, Agent, or Firm* — Haynes and Boone, LLP

(57) ABSTRACT

An automated firewall-compliant customer support resolution provisioning system includes a customer support system coupled to a customer device. The customer support system receives a first secure request from the customer device that identifies an event in the customer device and, in response, sends a first secure response through a firewall subsystem to the customer device within a first timeout period enforced by the firewall subsystem. The customer support system then determines event resolution information for the event. Subsequent to the first timeout period and based on the first secure response, the customer device sends a second secure request to the customer support system requesting the event resolution and the customer support system sends the event resolution information through the firewall subsystem to the customer device within a second timeout period enforced by the firewall subsystem. The customer device then utilizes the event resolution information to address the event.

20 Claims, 6 Drawing Sheets

(56) References Cited

U.S. PATENT DOCUMENTS

| | | | |
|---|---|---|---|
| 2006/0031476 A1* | 2/2006 | Mathes | H04L 41/0886 709/224 |
| 2013/0135820 A1* | 5/2013 | Wang | H05K 7/20836 361/679.48 |
| 2014/0181051 A1* | 6/2014 | Montulli | G06F 11/1451 707/679 |
| 2017/0006135 A1* | 1/2017 | Siebel | H04L 67/02 |
| 2017/0344411 A1* | 11/2017 | Lee | G06F 11/008 |

* cited by examiner

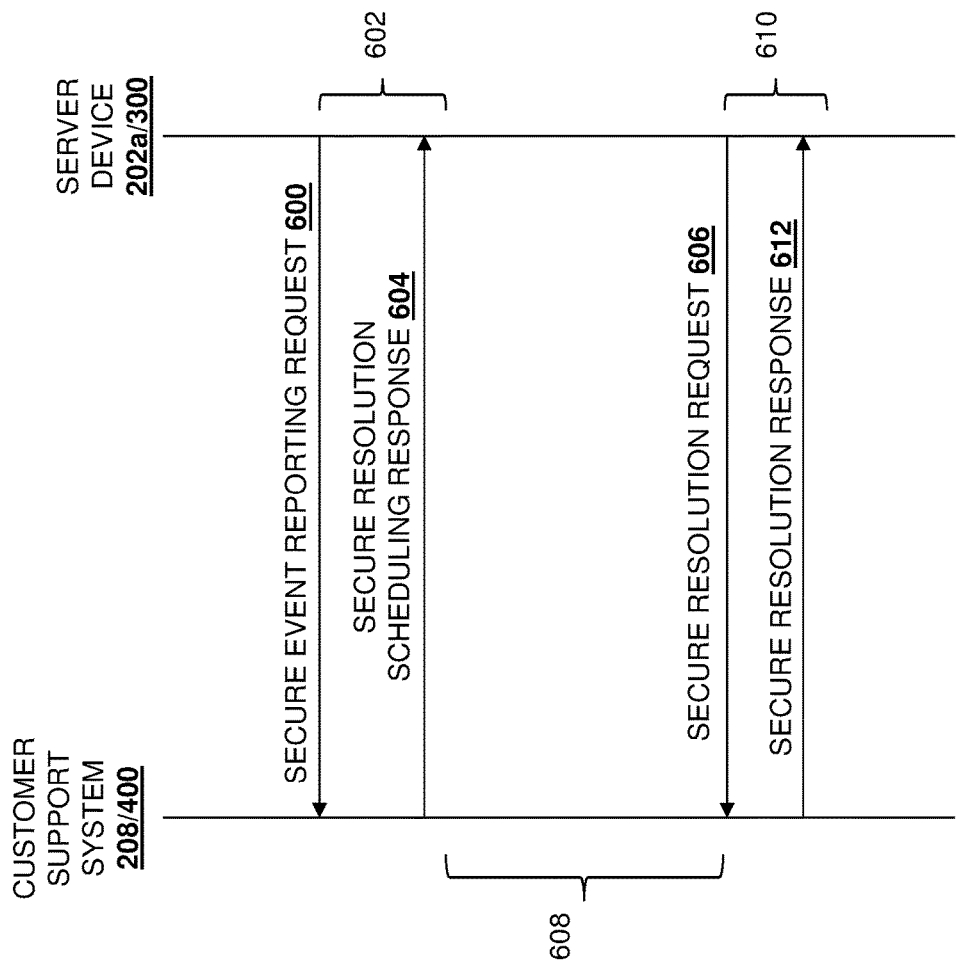

US 10,505,897 B2

AUTOMATED FIREWALL-COMPLIANT CUSTOMER SUPPORT RESOLUTION PROVISIONING SYSTEM

BACKGROUND

The present disclosure relates generally to information handling systems, and more particularly to automatically provisioning customer support resolutions to information handling systems in a firewall-compliant manner.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes "supported" in order, for example, to provide those information handling systems and/or their users with information needed to ensure proper operation of the information handling systems. For example, a customer system may include one or more customer devices such as server devices, and events may occur in those server devices that require customer support. Such customer systems are typically coupled to customer support systems via a network, and users or administrators of the customer system may report events to the customer support system in order to receive customer support resolutions that address and/or remedy issues associated with those events. However, the need for users or administrators to report events in their customer system typically requires an event that causes an issue that effects the availability or functionality of the customer system (i.e., in a manner that causes the user or administrator to recognize that event), thus resulting in a negative experience for the user or administrator, and missing the opportunity to address events in the customer system before they cause issues that result in such negative experiences. However, automating the reporting of events and the subsequent provisioning of resolutions is problematic in many customer systems, as typical customer systems include firewalls that prevent the provisioning of the customer support resolution to the customer system without some user or administrator involvement.

Accordingly, it would be desirable to provide an automated firewall-compliant customer support resolution provisioning system.

SUMMARY

According to one embodiment, an Information Handling System (IHS) includes a communication subsystem; a processing subsystem that is coupled to the communication subsystem; and a memory subsystem that is coupled to the processing subsystem and that includes instructions that, when executed by the processing subsystem, cause the processing subsystem to provide a customer support engine that is configured to: receive, through the communication subsystem from a customer device, a first secure request that identifies an event that occurred in the customer device; send, through the communication subsystem to the customer device in response to receiving the first secure request and within a first timeout period that is associated with the first secure request and that is enforced by a firewall subsystem associated with the customer device, a first secure response that is configured to cause the customer device to send a second secure request that requests an event resolution subsequent to the first timeout period; determine event resolution information for the event that occurred in the customer device; receive, through the communication subsystem from the customer device and subsequent to the first timeout period, the second secure request that requests the event resolution; and send, through the communication subsystem to the customer device in response to receiving the second secure request and within a second timeout period that is associated with the second secure request and that is enforced by the firewall subsystem associated with the customer device, the event resolution information that is configured to address the event that occurred in the customer device.

BRIEF DESCRIPTION OF THE DRAWINGS

FIG. 6 is a swim lane diagram illustrating an embodiment of communications between the server device FIG. 3 and the customer support system of FIG. 4 during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
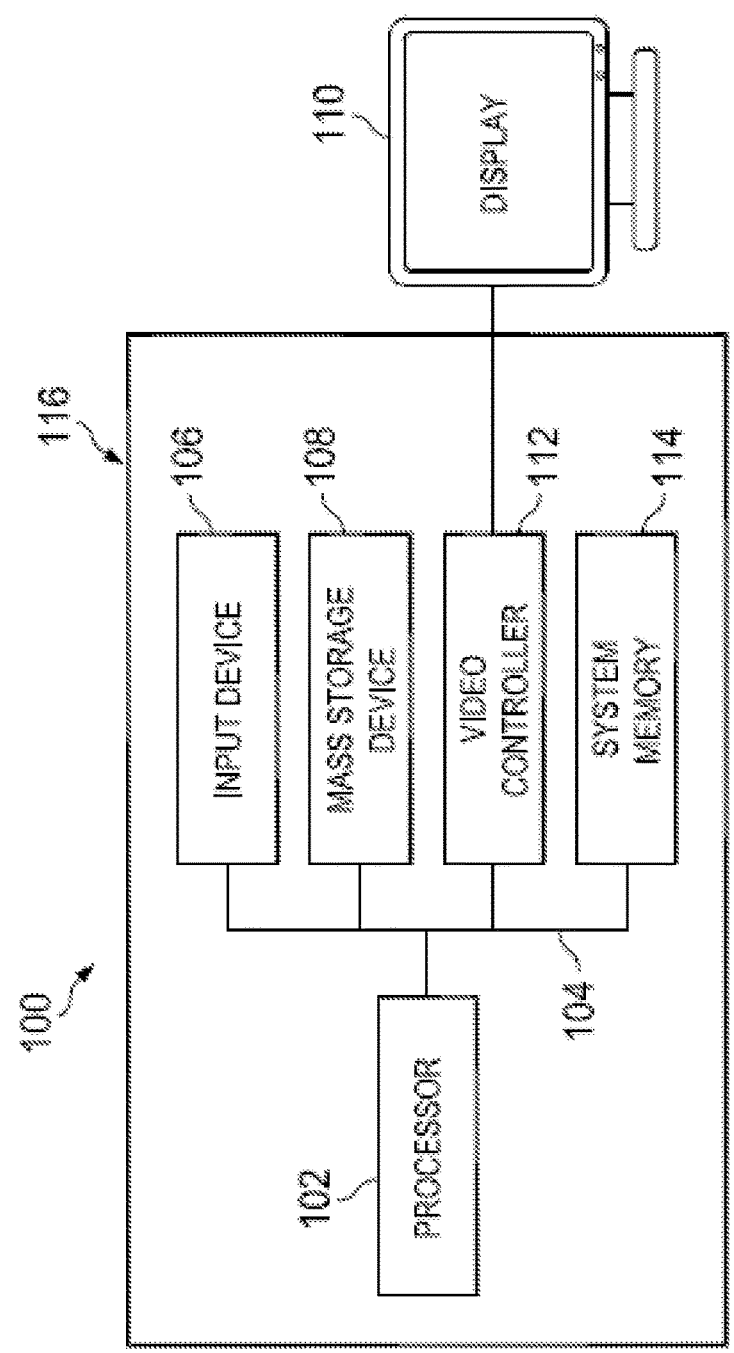
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
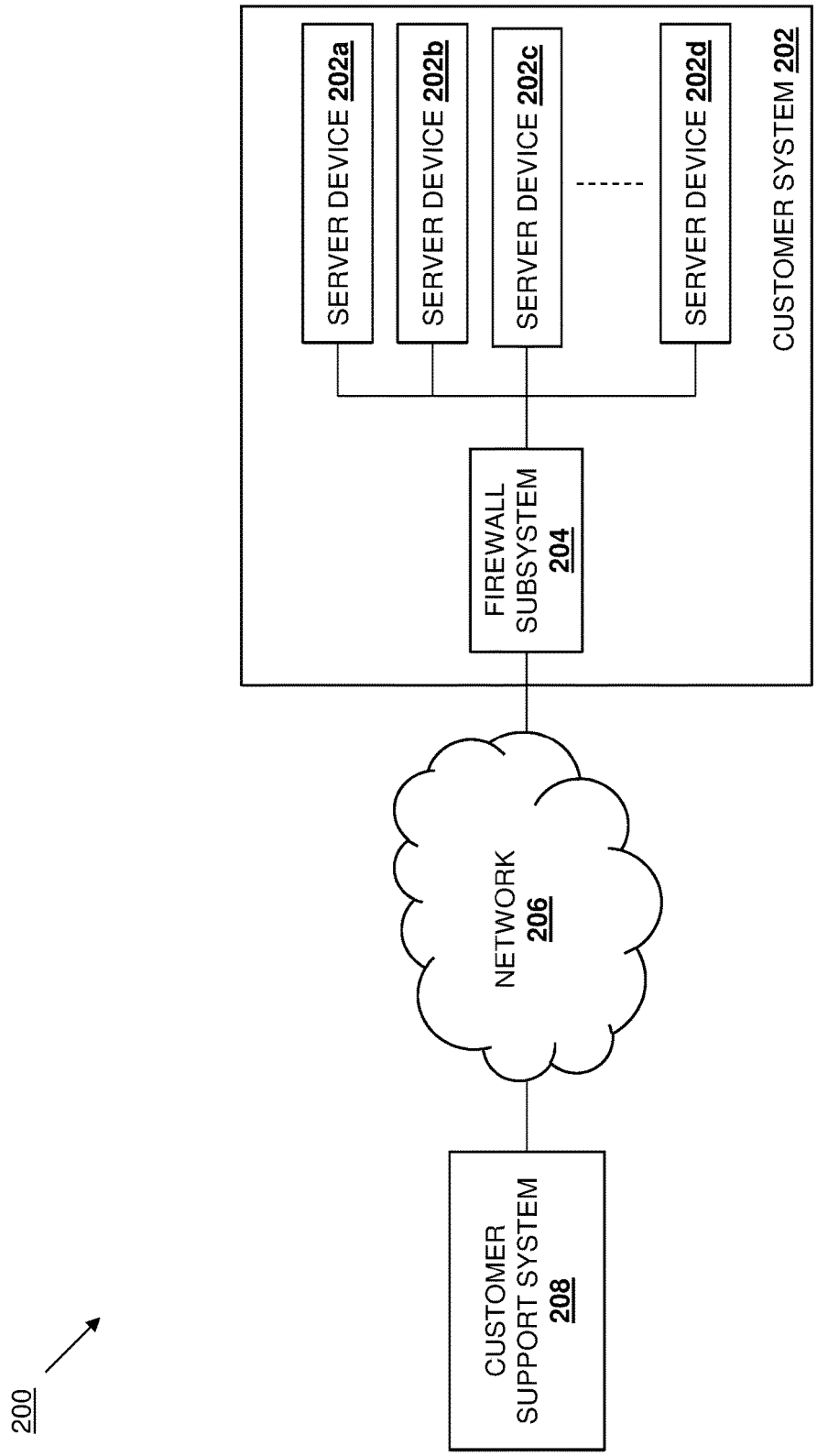
FIG. 2 is a schematic view illustrating an embodiment of an automated firewall-compliant customer support resolution provisioning system.

Referring now to FIG. 2, an embodiment of an automated firewall-compliant customer support resolution provisioning system 200 is illustrated. The automated firewall-compliant customer support resolution provisioning system 200 includes a customer system 202 that, in the illustrated embodiment, includes a plurality of server devices 202a, 202b, 202c, and up to 202d, each coupled to a firewall subsystem 204. In an embodiment, any or all of the server devices 202a-d may be the IHS 100 discussed above with reference to FIG. 1, and/or may include some or all of the components of the IHS 100. In an embodiment, the firewall subsystem 204 may be provided by one or more networking devices that are configured to monitor data traffic entering and exiting the customer system, and determine whether to allow or block the transmission of that data traffic based on security rules. As such, any or all of the networking device(s) that provide the firewall subsystem 204 may be the IHS 100 discussed above with reference to FIG. 1, and/or may include some or all of the components of the IHS 100. In a specific example, the server devices 202a-202d may be provided in one or more server racks, and coupled to one or more networking devices that provide the firewall subsystem 204. However, in other embodiments, the customer system 202 may include other types of customer devices (e.g., networking devices, storage devices, desktop computing devices, laptop computing devices, tablet computing devices, mobile phones, etc.) that may be coupled to the firewall subsystem 204, and/or that may include integrated firewall subsystems, while remaining within the scope of the present disclosure.

The customer system 202 is coupled to a network 206 that may be a Local Area Network (LAN), the Internet, and/or a variety of other networks known in the art. As illustrated, the firewall subsystem 204 in the customer system 202 is coupled to the network 206, and between the server devices 206a-d and the network 206 in order to provide the data traffic monitoring and firewall functionality discussed above. A customer support system 208 is coupled to the network 206, and may include one or more customer support devices (not illustrated), any of which may be the IHS 100 discussed above with reference to FIG. 1 and/or include some or all of the components of the IHS 100. As discussed below, the customer support system and/or its customer support devices are configured to perform the customer support functionality discussed below. While a specific automated firewall-compliant customer support resolution provisioning system 200 has been illustrated and described, one of skill in the art in possession of the present disclosure will recognize that different devices other than those illustrated in FIG. 2 may be provided and/or different configurations of the devices other than that illustrated in FIG. 2 may be utilized to provide the functionality discussed below while remaining within the scope of the present disclosure.

Figure 3:
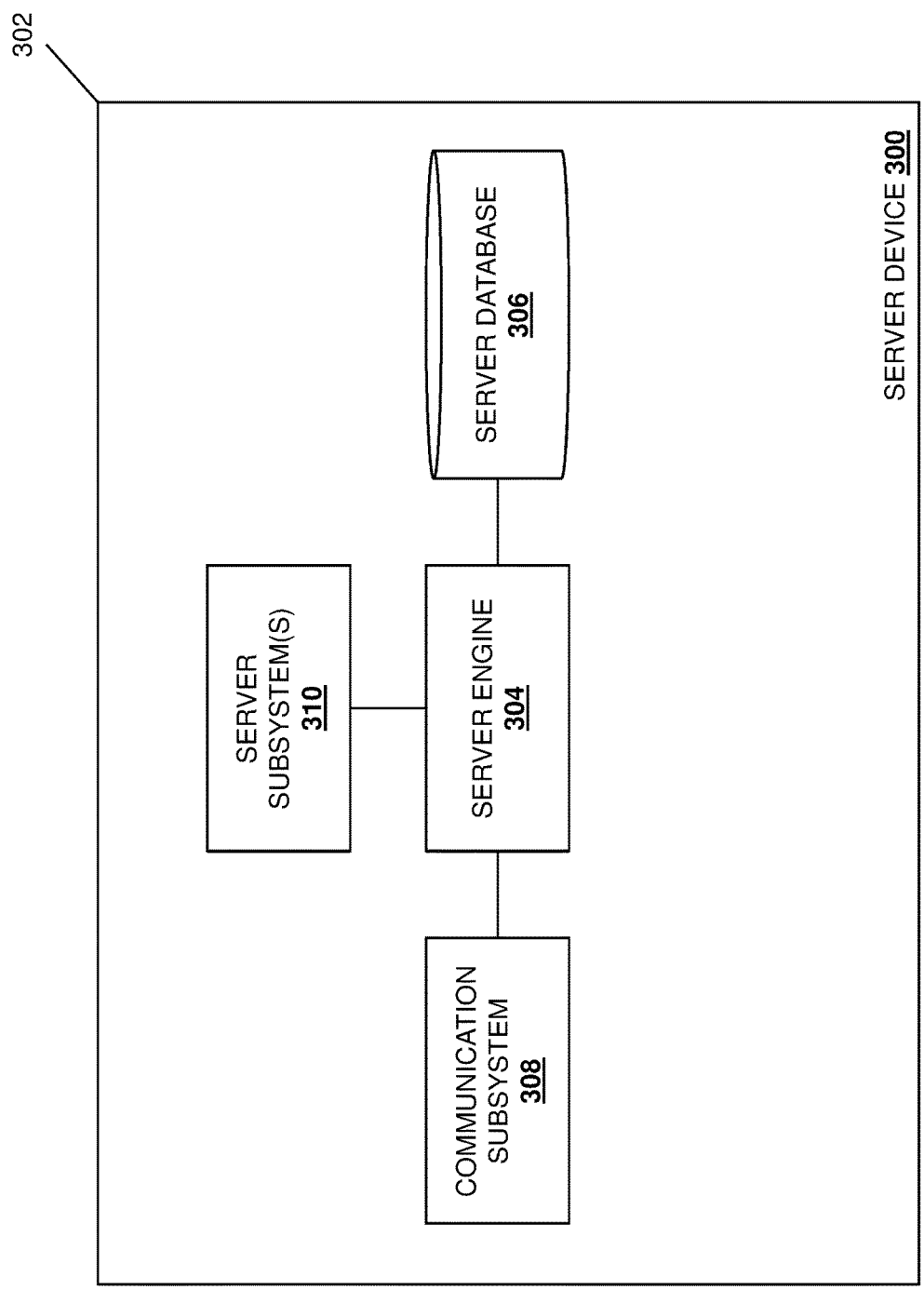
FIG. 3 is a schematic view illustrating an embodiment of a server device used in the automated firewall-compliant customer support resolution provisioning system of FIG. 2.

Referring now to FIG. 3, an embodiment of a server device 300 is illustrated that may be any of the server devices 202a-d discussed above with reference to FIG. 2. As such, the server device 300 may be the IHS 100 discussed above with reference to FIG. 1 and/or include some or all of the components of the IHS 100, and in different embodiments may be provided by a variety of other customer devices known in the art. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a server engine 304 that is configured to perform the functions of the server engines and server devices discussed below.

The chassis 302 may also house a storage system (not illustrated, but which may include the storage device 108 discussed above with reference to FIG. 1) that is coupled to the server engine 304 (e.g., via a coupling between the storage system and the processing system) and that includes a server database 306 that is configured to store any of the information utilized to provide the functionality discussed below. The chassis 302 may also house a communication subsystem 308 that is coupled to the server engine 304 (e.g., via a coupling between the communication subsystem 308 and the processing system) and that may include Network Interface Controller (NIC), a wireless communication device (e.g., a BLUETOOTH® communication device, a Near Field Communication (NFC) device, a WiFi communication device, and/or other wireless devices known in the art), and/or other communication components that would be apparent to one of skill in the art in possession of the present disclosure. The chassis 302 may also house a variety of other server subsystem(s) that, as discussed below, may experience, detect, and/or otherwise be involved with events that occur in and/or as a result of the operation of the server device 300, and that are reported to the customer support system 208. While a specific server device 300 has been illustrated and described, one of skill in the art in possession of the present disclosure will recognize that server device (and other customer devices) may include a variety of other components and/or component configurations that operate to provide convention server device functionality (or other customer device functionality), as well as the functionality discussed below, while remaining within the scope of the present disclosure.

Figure 4:
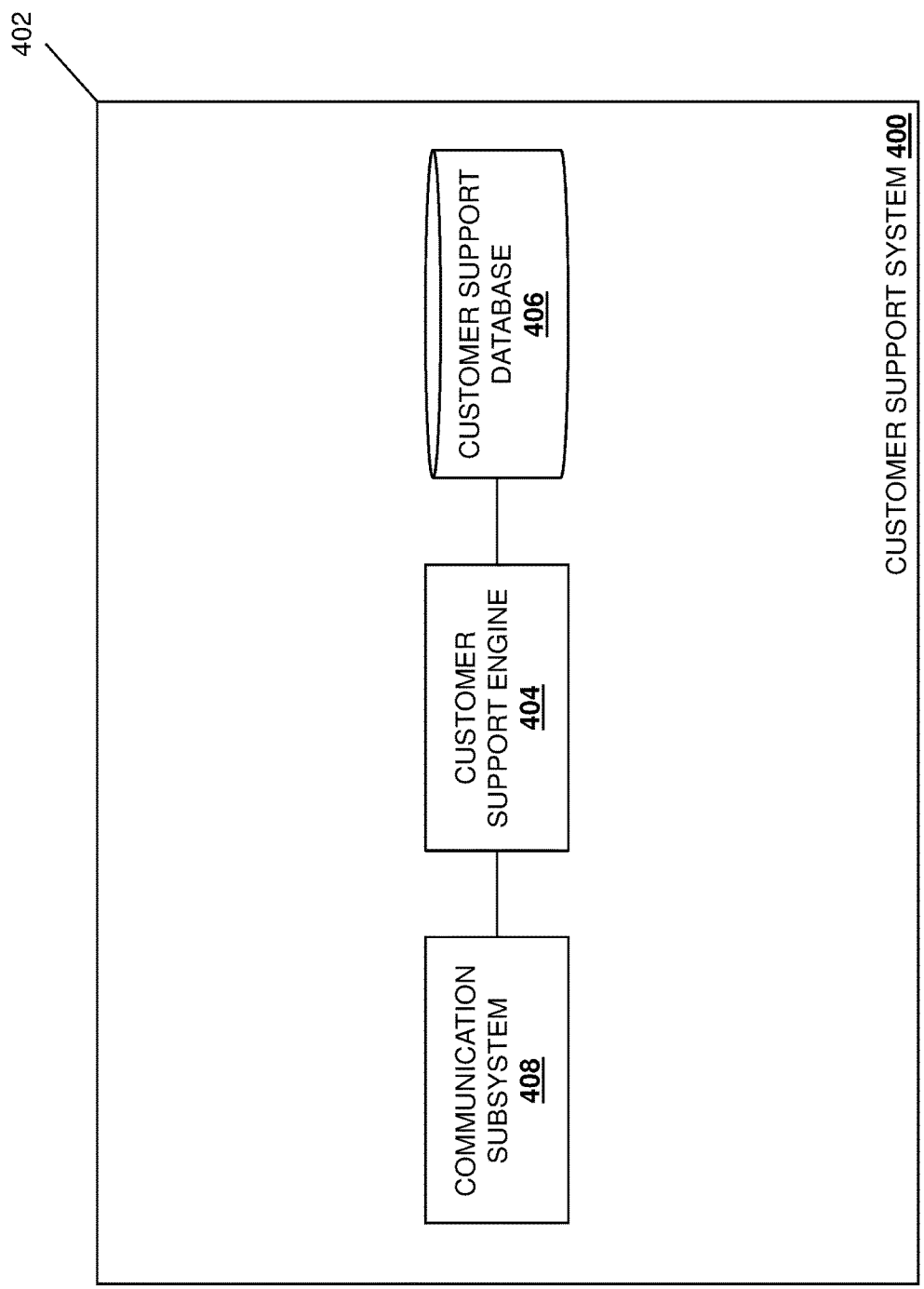
FIG. 4 is a schematic view illustrating an embodiment of a customer support system used in the automated firewall-compliant customer support resolution provisioning system of FIG. 2.

Referring now to FIG. 4, an embodiment of a customer support system 400 is illustrated that may be the customer support system 208 discussed above with reference to FIG. 2. As such, the customer support system 300 may be the IHS 100 discussed above with reference to FIG. 1 and/or include some or all of the components of the IHS 100, and in specific embodiments may be provided by one or more customer support devices known in the art. In the illustrated embodiment, the customer support system 400 includes a chassis 402 that houses the components of the customer support system 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a customer support engine 404 that is configured to perform the functions of the customer support engines and customer support systems discussed below.

The chassis 402 may also house a storage system (not illustrated, but which may include the storage device 108 discussed above with reference to FIG. 1) that is coupled to the customer support engine 344 (e.g., via a coupling between the storage system and the processing system) and that includes a customer support database 406 that is configured to store any of the information utilized to provide the functionality discussed below. The chassis 402 may also house a communication subsystem 408 that is coupled to the customer support engine 404 (e.g., via a coupling between the communication subsystem 408 and the processing system) and that may include Network Interface Controller (NIC), a wireless communication device (e.g., a BLUETOOTH® communication device, a Near Field Communication (NFC) device, a WiFi communication device, and/or other wireless devices known in the art), and/or other communication components that would be apparent to one of skill in the art in possession of the present disclosure. While a specific customer support system 400 has been illustrated and described, one of skill in the art in possession of the present disclosure will recognize that customer support systems (and its customer support device(s)) may include a variety of other components and/or component configurations that operate to provide convention customer support system functionality, as well as the functionality discussed below, while remaining within the scope of the present disclosure.

Figure 5:
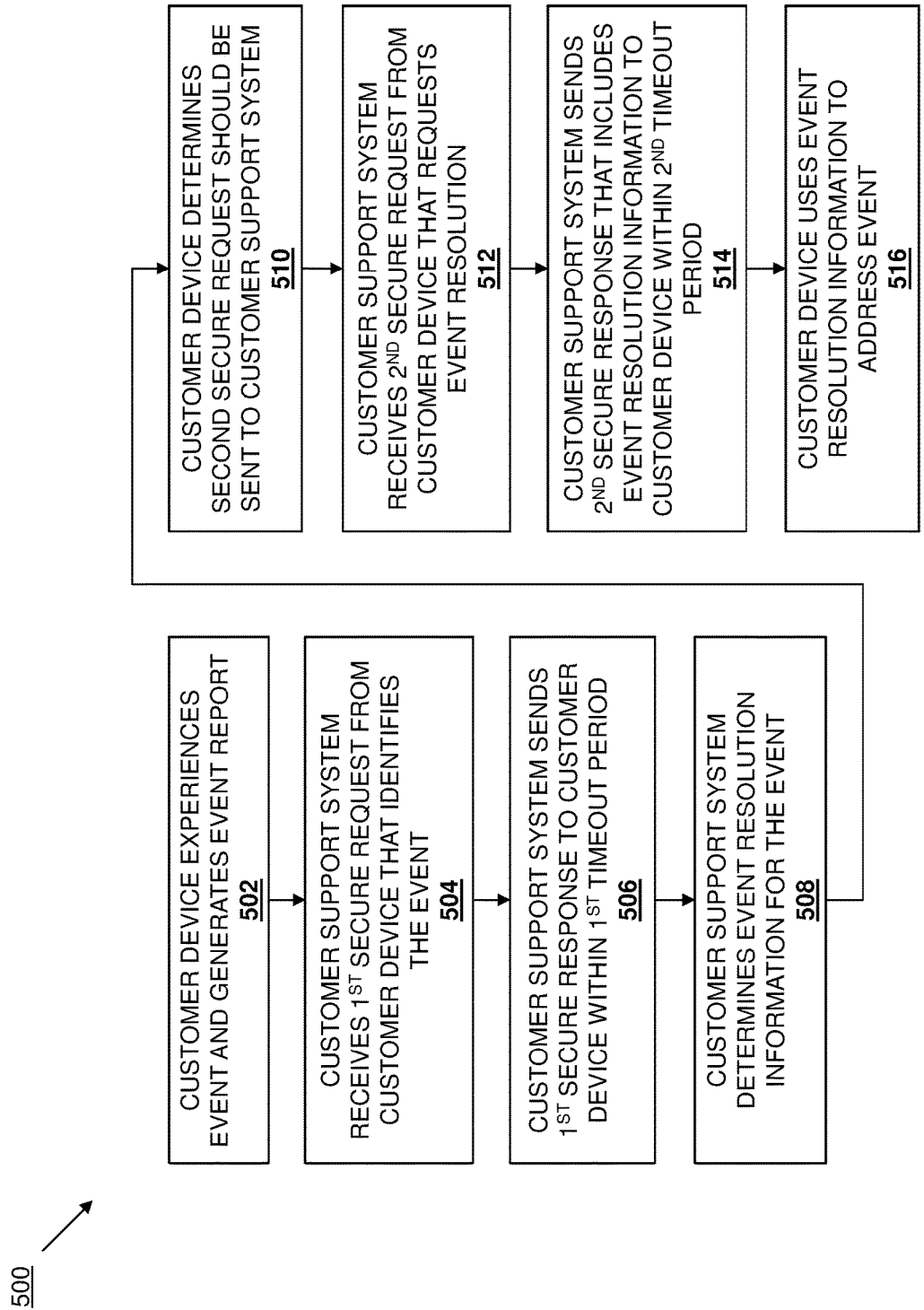
FIG. 5 is a flow chart illustrating an embodiment of a method for providing automatic, firewall-compliment customer support resolutions.

Referring now to FIG. 5, an embodiment of a method 500 for providing automatic, firewall-compliment customer support resolutions is illustrated. As discussed below, the systems and methods of the present disclosure provide for the automated provisioning of customer support resolutions in a manner that is firewall-compliant in order to reduce and/or eliminate the need for users or administrators to report events in their customer devices, thus providing the ability to reduce and/or eliminate the number of events in customer devices that cause issues that effect the availability or functionality of the customer devices (i.e., in a manner that causes the user or administrator to recognize that event). These benefits may be enabled in a customer support system by providing, when a customer device in a customer system reports event(s) using a first secure request, a first secure response that is configured to cause that customer device to send a second secure request that requests an event resolution subsequent to a first timeout period associated with the first secure request. Such first secure responses may, for example, designate a time period subsequent to the first timeout period within which to send the second secure request. The customer support system may then determine event resolution information for the event and, when the customer device then sends the second secure request, send the event resolution information in a second secure response within a second timeout period associated with the second secure request. As such, a firewall subsystem in the customer system that enforces timeout periods associated with secure requests will allow the second secure response to reach the customer device so that the customer device may utilize the event resolution information to address the event. As such, events in customer devices in a customer system that includes a firewall subsystem may be automatically addressed, and may in many cases may be addressed before they cause issues that result in negative customer experiences.

The method 500 begins at block 502 where a customer device experiences an event and generates an event report. In an embodiment, at block 502, one or more events may occur in the server device 202a/300 and, subsequent to detecting those events, the server engine 304 may generate an event report. For example, event(s) may occur in any of the server subsystems 310, the communication subsystem 308, the storage system, the processing system, the memory system, a software subsystem, and/or in or as a result of the operation of any other hardware and/or software component in the server device 202a/300. One of skill in the art in possession of the present disclosure will recognize that any of a variety of events may occur in the server device 202a/300 at block 502 that will result in the generation of an event report such as, for example, a fan event report that reports one or more events associated with a fan system in the server device 202a/300, a temperature event report that reports one or more events associated with a temperature in the server device 202a/300, a Central Processing Unit (CPU) event report that reports one or more events associated with a CPU in the server device 202a/300, a hard drive event report that reports one or more issues associated with a hard drive in the server device 202a/300, and/or other server device or customer device events known in the art. In an embodiment, an event report generated by the server engine 304 may include event information such as, for example, information indicative of a temperature associated with the motherboard exceeding some maximum threshold, information indicative of a fan device speed (e.g., rotations per minute (RPM)) exceeding some maximum threshold, and/or any other information that would be apparent to one of skill in the art in possession of the present disclosure. While the event occurring at block 502 is discussed as occurring in or as a result of the operation of the server device 202a, the event at block 502 may occur in or as a result of the operation of any or all of the other server devices 202b-202d, as well as in or as a result of the operation of any of a variety of customer devices while remaining within the scope of the present disclosure.

In some embodiments, the server engine 304 in the server device 202a/300 may be configured to generate the event report as part of a scheduled server device report that is provided to the customer support system 208 on a reoccurring basis (e.g., hourly, nightly, weekly, monthly, and/or at any other frequency that would be apparent to one of skill in the art in possession of the present disclosure), and in the course of generating that scheduled server device report, many include one or more event reports describing the event(s) that have occurred in or as a result of the operation of the server device 202a/300 (e.g., the events that have occurred subsequent to the most recent scheduled server device report.) As such, server devices (and/or other customer devices) in the customer system 202 may be configured to automatically generate reports during predetermined and reoccurring time periods that may identify events that have occurred in or as a result of the operation of those server devices.

In some embodiments, the server engine 304 in the server device 202a/300 may be configured to generate the event report in response to event(s) occurring in or as a result of the operation of the server device 202a/300. For example, at block 502, the server device 202a/300 may experience an event, the server engine 304 may detect that event and, in direct response to detecting that event, may generate the event report that describes and/or identifies the event. As such, server devices (and/or other customer devices) in the customer system 202 may be configured to automatically generate event reports in direct response to detecting the event(s) have occurred in or as a result of the operation of those server devices. In specific examples of the generation of event reports in direct response to detecting events, the server engine 304 may compare a detected event to an event reporting database (e.g., stored in the storage system as part of the server database 306) to determine whether to generate the event report that identifies that event. As such, the server engine 304 may detect an event experienced by the server device 202a/300, determine whether that event is included (or otherwise indicated as significant enough to report) in the event reporting database, and then generate the event report for that event if the event is included (or otherwise indicated as significant enough to report) in the event reporting database, while ignoring the event if the event is not included (or otherwise indicated as not significant enough to report) in the event reporting database.

In yet other embodiments, the scheduled reporting of events and the direct reporting of events in response to their detection may be combined by, for example, generating event reports in direct response to their detection if the event is included (or otherwise indicated as significant enough to report) in an event reporting database, while generating the event report and including it in a scheduled server device report if the event is not included (or otherwise indicated as not significant enough to immediately report) in the event reporting database. Furthermore, an event report may be generated by the server device 202a/300 in direct response to an instruction or command provided by a user and/or administrator of the server device 202a/300. While some specific examples have been provided, one of skill in the art in possession of the present disclosure will recognize that events may be detected, and event reports may be generated, in a variety of manners that will fall within the scope of the present disclosure as well.

The method 500 then proceeds to block 504 where a customer support system receives a first secure request from the customer device that identifies the event. In an embodiment, at block 504, the server engine 304 in the server device 202a/300 may operate to send the event report that was generated at block 502 as part of a first secure request that is sent through the communication subsystem 308 in the server device 202a/300 and to the firewall subsystem 204 in the customer system 202. As such, the server engine 304 may generate the first secure request and send an event report in that first secure request at block 504 each time an event is detected in or as a result of the operation of the server device 202a/300, and/or as part of scheduled server device reports, as discussed above. In a specific embodiment, the first secure request may be a first HyperText Transfer Protocol Secure (HTTPS) request that includes the event report along with any other information that would be apparent to one of skill in the art in possession of the present disclosure. While not illustrated, the customer support system 208/400 may include a firewall subsystem (i.e., similar to the firewall subsystem 204 described herein) that may allow the transmission of secure requests from the customer system 202 into the customer support system 208 due to, for example, a security key provided in those secure request by the server device 202a/300.

As discussed above, the firewall subsystem 204 may operate to monitor data traffic exiting the customer system 202, and determine whether to allow or block the transmission of that data traffic based on security rules. As such, at block 504 and upon receiving the first secure request including the event report, the firewall subsystem 204 may analyze the first secure request including event report (and/or any other information transmitted in the first secure request and/or along with the event report), and allow the transmission of the first secure request including the event report out of the customer system 202 and through the network 206 to the customer support system 208. In an embodiment, the first secure request is associated with a first timeout period. For example, the first timeout period may be a period of time subsequent to receiving and/or sending the first secure request within which a response to the first secure request will be allowed. Using the specific example above in which the first secure request is a first HTTPS request, the first timeout period may be an HTTPS timeout period specified by the HTTPS specification, although other secure responses associated with other timeout periods will fall within the scope of the present disclosure as well. As such, at block 504 the firewall subsystem 204 may allow the transmission of the first secure request including the event report through the network 206 to the customer support system 208, and begin a timer, counter, or other mechanism for tracking the first timeout period. As such, at block 504, the customer support system 208 may receive the first secure request through the network 206. In some embodiments, the first secure request may include a pre-authorized client key or other authentication information provided by the customer system 202 that will cause the customer support system 208 to accept the first secure request as an authenticated request.

With reference to FIG. 6, the server device 202a/300 is illustrated sending the first secure request as a secure event reporting request 600 that is associated with the first timeout period 602, and the customer support system 208/400 is illustrated a receiving that secure event reporting request 600. In an embodiment, at block 504 the customer support engine 404 in the customer support system 400 may receive the first secure request through its communication subsystem 408. While specific examples of a customer support system receiving a first secure request that identifies an event from a customer device have been described, one of skill in the art in possession of the present disclosure will recognize that a variety of different techniques for providing and receiving secure requests may fall within the scope of the present disclosure as well.

The method 500 then proceeds to block 506 where the customer support system sends a first secure response to the customer device within a first timeout period. In an embodiment, at block 506 and in response to receiving the first secure request at block 504, the customer support engine 404 in the customer support system 208/400 may generate a first secure response and send that first secure response through the network 206 to the customer system 202 within the first timeout period that is associated with the first secure request. In a specific embodiment, the first secure response may be a first HTTPS response to the first HTTPS request received at block 504, and may be sent within the first HTTPS timeout period, although other types of secure response will fall within the scope of the present disclosure as well. At block 504 and upon receiving the first secure response, the firewall subsystem 204 may analyze the first secure response, and determine whether to allow the transmission of the first secure response to the server device 202a/300. For example, at block 506 the firewall subsystem 204 may determine that the first secure response has been received within the first timeout period (e.g., as indicated by the timer, counter, or other mechanism for tracking the first timeout period initiated at block 504) and, in some embodiments, that the first secure response does not include any data that runs afoul of other security rules enforced by the firewall subsystem 204 and, in response, allow the transmission of the first secure response to the server device 202a/300 such that it is received by the server engine 304 through the communication subsystem 308. Furthermore, in some examples, at block 506 the firewall subsystem 204 may determine that the first secure response has been received outside of the first timeout period (e.g., as indicated by the timer, counter, or other mechanism for tracking the first timeout period initiated at block 504) and/or that the first secure response includes data that runs afoul of other security rules enforced by the firewall subsystem 204 and, in response, deny the transmission of the first secure response to the server device 202a/300. However, one of skill in the art in possession of the present disclosure will recognize that the firewall subsystem 204 may perform a variety of other actions to transmit the first secure response to the server device 202a/300 while remaining within the scope of the present disclosure as well.

As discussed below, the first secure response sent by the customer support engine 404 at block 506 may include a variety of information that is configured to cause the server device 202a/300 to send a second secure request that requests an event resolution subsequent to the first timeout period associated with the first secure request. In some embodiments, the first secure response sent by the customer support engine 404 at block 506 may include a first secure request confirmation that confirms the receipt of the first secure request and/or the event report, and the server engine 304 may be configured to subsequently send a second secure request (e.g., following the first timeout period) in response to receiving the first secure request confirmation. For example, the server engine 304 may be configured to wait a predetermined time period subsequent to receiving a first secure request confirmation and then, once its associated predetermined time period has elapsed, send a second secure request, discussed below.

In some embodiments, the first secure response sent by the customer support engine 404 at block 506 may include a second secure request timing instruction that confirms the receipt of the first secure request and/or the event report, and/or that requests the sending of a second secure request during a particular, subsequent time period, and the server engine 304 may be configured to subsequently send the second secure request (e.g., following the first timeout period) during that particular, subsequent time period. For example, the server engine 304 may be configured to monitor for the particular, subsequent time period identified in the first secure response in response to receiving a second secure request timing instruction and then, once that particular, subsequent time period is reached, send a second secure request, discussed below. In some examples, the customer support engine 404 may estimate an amount of time it expects to pass before event resolution information is determined for the event identified in the first secure request, and then use that amount of time to determine the particular, subsequent time period provided in the first secure response. While a few specific examples have been provided, one of skill in the art in possession of the present disclosure will recognize that a variety of information may be provided in the first secure response to cause the server device to send the second secure request discussed below while remaining within the scope of the present disclosure.

With reference to FIG. 6, the customer support system 208/400 is illustrated sending the first secure response as a secure resolution scheduling response 604 that is received by the firewall subsystem 204 and provided to the server device 202a/300 with the first timeout period 602. In an embodiment, at block 506 the server engine 404 in the server device 300 may receive the first secure response through its communication subsystem 308. While not illustrated in FIG. 6, the server device 202a/300 may be configured to repeat the sending of the first secure request/secure event reporting request 600 in the event a first secure response/secure resolution scheduling response 604 is not received within the first timeout period 602. As such, the method 500 may include the server device 202a/300 sending secure request/ secure event reporting requests 600 multiple times until either the first secure response/secure resolution scheduling response 604 is received, or some maximum number of secure requests is reached. While specific examples of a customer support system sending a first secure response that is configured to cause a customer device to send a subsequent second secure request have been described, one of skill in the art in possession of the present disclosure will recognize that a variety of different techniques for providing and receiving secure responses may fall within the scope of the present disclosure as well.

The method 500 then proceeds to block 508 where the customer support system determines event resolution information for the event. In an embodiment, at block 508, the customer support engine 404 may operate to receive and/or determine event resolution information for the event that was experienced by the server device 202a/300. For example, the customer support database 406 may include a plurality of previously stored events in association with respective event resolution information that was previously provided to a customer system to remedy events experienced by its customer devices. As such, at block 508, the customer support engine 404 may operate access the customer support database 406 using the event that was identified in the first secure request, automatically match that event to a stored event in the customer support database 406, and then automatically identify the event resolution information associated with that stored event in the customer support database 406. In some examples, the customer support database 406 may identify high priority events and/or issues that may be addressed by the customer support engine 404 before lower priority events and/or issues. As such, the customer support system 400 may be configured to automatically receive events customer devices and determine event resolution information for those events without the need for a user or administrator of the customer support system 400 to review or analyze that event.

However, in other examples, user(s) and/or administrator(s) of the customer support system 400 may review or analyze the event that was experienced by a customer device in order to determine the event resolution information for that event. For example, the customer support engine 404 may access the customer support database 406 using the event that was identified in the first secure request and determine that that event is not included in the customer support database 406, that no event resolution information is associated with that event in the customer support database 406, or that event resolution information for that event is otherwise unavailable and, in response, forward that event and information about that event to a user or administrator of the customer support system 202/400 so that event resolution information may be determined. While one of skill in possession of the present disclosure will recognize that virtually any information for resolving issues that result from events in customer devices may be determined at block 508, examples of event resolution information may include firmware updates, software patches, Basic Input/Output System (BIOS) corrections, and/or any other event resolution information known in the art. In a specific example using the temperature events discussed above, event resolution information may be included in the following eXtensible Markup Language (XML) format that will be sent to the customer system 202 to provide for automatic addressing of the event (discussed below):

```
<EventResolution Model="PowerEdge R740" ServiceTag="SVCTG18"
TimeStamp="Mon Jul 24 15:20:01 2017">
<!--Auto Resolution for ticket# 1357!-->
<Component FQDD="System.Embedded.1#Fan.1">
<Attribute Name="ThermalSettings.1#MinimumFanSpeed">255</
Attribute>
<Attribute Name="ThermalSettings.1#RunningSpeed">455</Attribute>
</Component>
</EventResolution>
```

In another specific example, event resolution information may be included in the following eXtensible Markup Language (XML) format that will be sent to the customer system 202 to provide for automatic addressing of a remote access controller event (discussed below) that may occur in a remote access controller device such as, for example, an integrated Remote Access Controller (iDRAC) available from DELL® Inc., of Round Rock, Tex., United States:

```
<EventResolution Model="PowerEdge R740" ServiceTag="SVCTG18"
TimeStamp="Mon Jul 24 15:20:01 2017">
<!--Auto Resolution to update specific iDRAC firmware for ticket#
2468!-->
<Component FQDD="iDRAC.Embedded.1#iDRACFirmware">
<Attribute Name="TRepositoryUpdate">ftp://dell.com/R740/3.01.00.00/
iDRAC.BIN</Attribute>
</Component>
</EventResolution>
```

The method 500 then proceeds to block 510 where the customer device determines that a second secure request should be sent to the customer support system. In an embodiment, at block 510 and based on the first secure response, the server engine 304 in the server device 202*a*/300 may determine that a second secure request should be send to the customer support system 208/400. As discussed above, the first secure response may include a variety of information that will cause the server engine 304 in the server device 202*a*/300 to determine that the second secure request should be sent at block 510. In some embodiments, the server engine 304 in the server device 202*a*/300 may utilize a first secure request confirmation from the first secure response that confirmed the receipt of the first secure request and/or the event report in order to determine that a second secure request should be sent to the customer support system. For example, the server engine 304 may determine that a predetermined time period subsequent to receiving the first secure request confirmation has passed and in response, determine that the second secure request should be sent to the customer support system 208/400.

In some embodiments, the server engine 304 in the server device 202*a*/300 may utilize a second secure request timing instruction from the first secure response that confirmed the receipt of the first secure request and/or the event report, and/or that requested the sending of a second secure request during a particular, subsequent time period, and the server engine 304 may determine that that particular, subsequent time period has been reached and, in response, determine that the second secure request should be sent to the customer support system 208/400. While a few specific examples have been provided, one of skill in the art in possession of the present disclosure will recognize that a variety of information may be utilized by the server device 202*a*/300 to determine when to send the second secure request while remaining within the scope of the present disclosure. In response to determining that the second secure request should be sent to the customer support system 208/400, the server device 202*a*/300 may generate the second secure request. In a specific embodiment, the second secure request may be a second HTTPS request that requests an event resolution for the event along with any other information that would be apparent to one of skill in the art in possession of the present disclosure.

The method 500 then proceeds to block 512 where the customer support system receives a second secure request from the customer device that requests an event resolution. In an embodiment, at block 512, the server engine 304 in the server device 202*a*/300 operates to send the second secure request through its communication subsystem 308 to the firewall subsystem 204. As discussed above, the firewall subsystem 204 may operate to monitor data traffic exiting the customer system 202, and determine whether to allow or block the transmission of that data traffic based on security rules. As such, at block 512 and upon receiving the second secure request including the request for the event resolution, the firewall subsystem 204 may analyze the second secure request that requests the event resolution (and/or any other information transmitted in the second secure request and/or along with the request for the event resolution), and allow the transmission of the second secure request including the request for the event resolution out of the customer system 202 and through the network 206 to the customer support system 208. In an embodiment, the second secure request is associated with a second timeout period. For example, the second timeout period may be a period of time subsequent to receiving and/or sending the second secure request within which a response to the second secure request will be allowed. Using the specific example above in which the second secure request is a second HTTPS request, the second timeout period may be an HTTPS timeout period specified by the HTTPS specification, although other secure responses associated with other timeout periods will fall within the scope of the present disclosure as well. As such, at block 512 the firewall subsystem 204 may allow the transmission of the second secure request including the request for the event resolution through the network 206 to the customer support system 208, and begin a timer, counter, or other mechanism for tracking the second timeout period. As discussed above, in some embodiments the second secure request may include a pre-authorized client key or other authentication information provided by the customer system 202 that will cause the customer support system 208 to accept the second secure request as an authenticated request.

With reference to FIG. 6, the server device 202*a*/300 is illustrated sending the second secure request as a secure resolution request 606 that is sent following a time period 608 that extends past the first timeout period 602, and that is associated with the second timeout period 610, and the customer support system 208/400 is illustrated a receiving that secure resolution request 606. In an embodiment, at block 610 the customer support engine 404 in the customer support system 400 may receive the second secure request through its communication subsystem 408. While specific examples of a customer support system receiving a second secure request that request an event resolution from a customer device have been described, one of skill in the art in possession of the present disclosure will recognize that a variety of different techniques for providing and receiving secure requests may fall within the scope of the present disclosure as well.

In some embodiments, the customer support engine 404 in the customer support system 208/400 may not have determined the event resolution information for the event that was experienced by the server device 202*a*/300 when the second secure request/secure resolution request 606 is received. In such embodiments, the customer support engine 404 may generate a secure response that is substantially similar to the first secure response/secure resolution scheduling response 604, and send that secure response to the server device 202*a*/300 within the second timeout period 610, which will cause the server device 202*a*/300 to subsequently send a secure request that is substantially similar to the second secure request/secure resolution request 606 following the second timeout period 610. In other words, if the event resolution information has not been determined when the server device 202*a*/300 sends the initially "scheduled" secure request for it, the customer support system 208/400 will then schedule another secure request by the server device 202*a*/300 during a later time period so that the event resolution information may be determined and sent to the server device 202*a*/300 in the firewall-compliant manner described herein. This rescheduling of secure requests by the server device may continue until the event resolution information is determined.

The method 500 then proceeds to block 514 where the customer support system sends a second secure response to the customer device that includes the event resolution information within a second timeout period. In an embodiment, at block 514 and in response to receiving the second secure request at block 512, the customer support engine 404 in the customer support system 208/400 may generate a second secure response that includes the event resolution information determined at block 508, and send that second secure response through the network 206 to the customer system 202 within the second timeout period that is associated with the second secure request. In a specific embodiment, the second secure response may be a second HTTPS response to the second HTTPS request received at block 512, and may be sent within the second HTTPS timeout period, although other types of secure response will fall within the scope of the present disclosure as well. In some embodiments, the event resolution information may be provided in the second secure response as a Server Consideration Profile (SCP) eXtensible Markup Language (XML) file, although other methods and files for providing event resolution information in a secure response will fall within the scope of the present disclosure as well.

At block 514 and upon receiving the second secure response, the firewall subsystem 204 may analyze the second secure response, and determine whether to allow or deny the transmission of the second secure response to the server device 202*a*/300. For example, at block 514 the firewall subsystem 204 may determine that the second secure response has been received within the second timeout period (e.g., as indicated by the timer, counter, or other mechanism for tracking the second timeout period initiated at block 512) and, in some embodiments, that the second secure response does not include any data that runs afoul of other security rules enforced by the firewall subsystem 204 and, in response, allow the transmission of the second secure response to the server device 202*a*/300 such that it is received by the server engine 304 through the communication subsystem 308. However, at block 514 the firewall subsystem 204 may instead determine that the second secure response has been received after the second timeout period (e.g., as indicated by the timer, counter, or other mechanism for tracking the second timeout period initiated at block 512) or that the second secure response includes data that runs afoul of other security rules enforced by the firewall subsystem 204 and, in response, deny the transmission of the second secure response to the server device 202*a*/300. However, one of skill in the art in possession of the present disclosure will recognize that the firewall subsystem 204 may perform a variety of other actions to transmit the second secure response to the server device 202*a*/300 while remaining within the scope of the present disclosure as well.

With reference to FIG. 6, the customer support system 208/400 is illustrated sending the second secure response as a secure resolution response 612 that is received by the firewall subsystem 204 and provided to the server device 202*a*/300 with the second timeout period 610. In an embodiment, at block 514 the server engine 404 in the server device 300 may receive the second secure response through its communication subsystem 308. While not illustrated in FIG. 6, the server device 202*a*/300 may be configured to repeat the sending of the second secure request/secure resolution request 606 in the event a second secure response/secure resolution response 612 is not received within the second timeout period 602. As such, the method 500 may include the server device 202*a*/300 sending secure requests/secure resolution requests 606 multiple times until either the second secure response/secure resolution response 612 is received, or some maximum number of secure requests is reached. While specific examples of a customer support system sending a second secure response that includes event resolution information have been described, one of skill in the art in possession of the present disclosure will recognize that a variety of different techniques for providing and receiving secure responses may fall within the scope of the present disclosure as well The method 500 then proceeds to block 516 where the customer device uses the event resolution information to address the event. In an embodiment, at block 516, the server engine 304 in the server device 202a/300 may access the event resolution information included in the second secure response and utilize that event resolution information to address the event that was experienced by the server device 202a/300 at block 502. For example, at block 516, the server engine 304 in the server device 202a/300 may execute an SCP XML file that holds the event resolution information that may include, for example, a firmware update, a software patch, a BIOS correction, the temperature event information discussed above, the remote access controller event information discussed above, and/or any other information that is configured to address the event that occurred in or as a result of the operation of the server device 202a/300 at block 502.

Thus, systems and methods have been described that provide for the automated provisioning of customer support resolutions in a manner that is firewall-compliant and that allows the automation of the addressing of events that occur in customer devices. One of skill in the art will recognize that first secure response from the customer support system that operates to schedule the subsequent second secure request from the customer device operates to enable the sending of the second secure response that includes the event resolution information in a manner that will allow that second secure response and its event resolution information through the firewall subsystem that controls access to the customer device. In other words, the firewall subsystem in a customer system will operate to block or prevent the sending of event resolution information to the customer device subsequent to a first timeout period associated with a first secure request from the customer device that identifies an event that has occurred in the customer device, but the systems and methods of the present disclosure enable such event resolution information to reach the customer device through the firewall subsystem by scheduling the second secure request using the first secure response that is sent within the first timeout period associated with the first secure request, and then responding to the second secure request with the event resolution information within the second timeout period associated with the second secure request.

Thus the systems and methods of the present disclosure provide the ability to reduce and/or eliminate the number of events in customer devices that cause issues that effect the availability or functionality of the customer devices (i.e., in a manner that causes the user or administrator to recognize that event) by allowing events to be automatically reported to the customer support system, and also enabling event resolution information to be automatically provided back to the customer device in a manner that is firewall-compliant such that the customer device may receive that event resolution information and utilize it to address any issues resulting from the event. As such, events in customer devices in a customer system that includes a firewall subsystem may be automatically addressed by providing firmware updates, software patches, BIOS corrections, addressing temperature events, addressing remote access controller event, and/or other providing any other event resolution information that may, in many cases, allow for the event to be addressed before it causes issues that result in negative customer experiences (or that are even recognized by the customer.)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automated firewall-compliant customer support resolution provisioning system, comprising:
    a customer system that includes:
        a server device; and
        a firewall subsystem that is coupled to the server device; and
    at least one customer support device that is coupled to the firewall device via a network, wherein the at least one customer support device is configured to:
        receive, via the network from the server device, a first secure request that identifies a server component event that occurred in the server device;
        send, via the network through the firewall subsystem to the server device in response to receiving the first secure request and within a first timeout period that is associated with the first secure request and that is enforced by the firewall subsystem, a first secure response that is configured to cause the server device to send a second secure request that requests an event resolution subsequent to the first timeout period;
        determine event resolution information for the server component event that occurred in the server device;
        receive, via the network from the server device and subsequent to the first timeout period, the second secure request that requests the event resolution; and
        send, via the network through the firewall subsystem to the server device in response to receiving the second secure request and within a second timeout period that is associated with the second secure request and that is enforced by the firewall subsystem, the event resolution information, wherein the customer device is configured to utilize the event resolution information to address the server component event that occurred in the server device.

2. The system of claim 1, wherein the first secure request is a first HyperText Transfer Protocol Secure (HTTPS) request, the first secure response is a first HTTPS response, the second secure request is a second HTTPS request, and the second secure response is a second HTTP response.

3. The system of claim 1, wherein the first timeout period and the second timeout period are HTTPS timeout periods.

4. The system of claim 1, wherein first secure response identifies a second secure request time period during which the second secure request should be sent by the server device, and wherein the second secure request is received by the customer support device from the server device during the second secure request time period.

5. The system of claim 1, wherein the customer support device is configured to determine the event resolution information for the server component event that occurred in the customer device by:
    automatically matching the server component event that occurred in the server device to a stored server component event included in a customer support device database; and
    automatically identifying the event resolution information that is associated with the stored server component event in the customer support device database.

6. The system of claim 1, wherein the server device is configured to:
    send, via the network to the customer support device subsequent to the first timeout period and prior to sending the second secure request, a third secure request that requests the event resolution; and send, via the network to the customer support device subsequent to sending the third secure request and in response to not receiving a response to the third secure request within a third timeout period associated with the third secure request, the second secure request that requests the event resolution.

7. The system of claim 1, wherein the server device is configured to:
send the first secure request that identifies the server component event that occurred in the server device as part of a scheduled customer device report that is sent to the customer support device on a reoccurring basis.

8. The system of claim 1, wherein the server device is configured to:
send the first secure request that identifies the server component event that occurred in the server device in direct response to detecting the server component event.

9. An Information Handling System (IHS), comprising:
a communication subsystem;
a processing subsystem that is coupled to the communication subsystem; and
a memory subsystem that is coupled to the processing subsystem and that includes instructions that, when executed by the processing subsystem, cause the processing subsystem to provide a customer support engine that is configured to:
receive, through the communication subsystem from a server device via a network, a first secure request that identifies a server component event that occurred in the server device;
send, through the communication subsystem to the server device via the network and a firewall subsystem coupled to the server device in response to receiving the first secure request and within a first timeout period that is associated with the first secure request and that is enforced by the firewall subsystem, a first secure response that is configured to cause the server device to send a second secure request that requests an event resolution subsequent to the first timeout period;
determine event resolution information for the server component event that occurred in the server device;
receive, through the communication subsystem from the server device via the network and subsequent to the first timeout period, the second secure request that requests the event resolution; and
send, through the communication subsystem to the server device via the network in response to receiving the second secure request and within a second timeout period that is associated with the second secure request and that is enforced by the firewall subsystem associated with the server device, the event resolution information that is configured to address the server component event that occurred in the server device.

10. The IHS of claim 9, wherein the first secure request is a first HyperText Transfer Protocol Secure (HTTPS) request, the first secure response is a first HTTPS response, the second secure request is a second HTTPS request, and the second secure response is a second HTTP response.

11. The IHS of claim 10, wherein the first timeout period and the second timeout period are HTTPS timeout periods.

12. The IHS of claim 9, wherein first secure response identifies a second secure request time period during which the second secure request should be sent by the serer device, and wherein the second secure request is received from the customer device during the second secure request time period.

13. The IHS of claim 9, wherein the customer support engine is configured to determine the event resolution information for the event that occurred in the server device by:
automatically matching the server component event that occurred in the server device to a stored server component event included in a customer support device database; and
automatically identifying the event resolution information that is associated with the stored server component event in the customer support device database.

14. A method for providing automatic, firewall-compliment customer support resolutions, comprising:
receiving, by a customer support system from a server device via a network, a first secure request that identifies a server component event that occurred in a server device that is included in a customer system;
sending, by the customer support system via the network and through a firewall subsystem that is included in the customer system and coupled to the server device in response to receiving the first secure request and within a first timeout period that is associated with the first secure request and that is enforced by the firewall subsystem, a first secure response that is configured to cause the server device to send a second secure request that requests an event resolution subsequent to the first timeout period;
determining, by the customer support system, event resolution information for the event that occurred in the server device;
receiving, by the customer support system from the server device via the network and subsequent to the first timeout period, the second secure request that requests the event resolution; and
sending, by the customer support system via the network and through the firewall subsystem in response to receiving the second secure request and within a second timeout period that is associated with the second secure request and that is enforced by the firewall subsystem, the event resolution information that is configured to address the server component event that occurred in the server device.

15. The method of claim 14, wherein the first secure request is a first HyperText Transfer Protocol Secure (HTTPS) request, the first secure response is a first HTTPS response, the second secure request is a second HTTPS request, and the second secure response is a second HTTP response.

16. The method of claim 14, wherein the first timeout period and the second timeout period are HTTPS timeout periods.

17. The method of claim 14, wherein first secure response identifies a second secure request time period during which the second secure request should be sent by the server device, and wherein the second secure request is received by the customer support system from the server during the second secure request time period.

18. The method of claim 14, wherein the customer support system determines the event resolution information for the server component event that occurred in the server device by:
automatically matching the server component event that occurred in the server device to a stored server component event included in a customer support system database; and automatically identifying the event resolution information that is associated with the stored server component event in the customer support system database.

19. The method of claim 14, further comprising:

sending, by the server device to the customer support system via the network subsequent to the first timeout period and prior to sending the second secure request, a third secure request that requests the event resolution; and sending, by the server device to the customer support system via the network subsequent to sending the third secure request and in response to not receiving a response to the third secure request within a third timeout period associated with the third secure request, the second secure request that requests the event resolution.

20. The method of claim 14, further comprising:

sending, by the server device via the network, the first secure request that identifies the server component event that occurred in the server device in direct response to detecting the server component event.

\* \* \* \* \*